US012418465B2

(12) United States Patent
Soha et al.

(10) Patent No.: US 12,418,465 B2
(45) Date of Patent: *Sep. 16, 2025

(54) SYSTEMS AND METHODS FOR ASSESSING A COMPUTING NETWORK'S PHYSICAL ROBUSTNESS

(71) Applicant: The MITRE Corporation, McLean, VA (US)

(72) Inventors: Michael James Soha, Chelmsford, MA (US); Allison Inez Mann, Highland Park, NJ (US); John Michael Zuena, Burlington, MA (US)

(73) Assignee: The MITRE Corporation, McLean, VA (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/532,586

(22) Filed: Dec. 7, 2023

(65) Prior Publication Data

US 2024/0113952 A1 Apr. 4, 2024

Related U.S. Application Data

(63) Continuation of application No. 17/956,425, filed on Sep. 29, 2022, now Pat. No. 11,855,866.

(51) Int. Cl.
*H04L 43/065* (2022.01)
*H04L 41/14* (2022.01)
*H04L 43/045* (2022.01)

(52) U.S. Cl.
CPC ......... *H04L 43/065* (2013.01); *H04L 41/14* (2013.01); *H04L 43/045* (2013.01)

(58) Field of Classification Search
CPC ...... H04L 41/14; H04L 43/045; H04L 43/065
See application file for complete search history.

(56) References Cited

U.S. PATENT DOCUMENTS 7,808,921 B2 * 10/2010 Zhang ............... H04L 45/123
370/252
8,561,184 B1 10/2013 Marsa et al.
(Continued)

FOREIGN PATENT DOCUMENTS

CN 105703957 A 6/2016
CN 110278108 A 9/2019
(Continued)

OTHER PUBLICATIONS

Chan, Hau et al. "Make It or Break It: Manipulating Robustness in Large Networks," SIAM International Conference on Data Mining (SDM), Apr. 24-26, 2014, Philadelphia, Pennsylvania, USA; 9 pages.
(Continued)

*Primary Examiner* — Jerry B Dennison
(74) *Attorney, Agent, or Firm* — Morrison & Foerster LLP

(57) ABSTRACT

Described herein are systems and methods for assessing a computing network's physical robustness to node and/or link failure during operation of the computing network. In one or more examples, the systems and methods can incorporate graph modeling and analysis techniques to assess the impact of node removal from a computing network and determine the impact that such removal has on the overall physical connectivity of the network. In one or more examples, a user or other entity can provide the system with a graph representation of a computing network, as well as specify the number of nodes to be removed (i.e., to simulate failure) to test the connectivity of the network. The system using these inputs can determine a worst-case scenario operating condition based on the inputs provided by the user, and can also assess the "network merit" which can represent
(Continued)

a user-programmable definition that can represent a plurality desired types of connectivity.

30 Claims, 12 Drawing Sheets

(56) References Cited

U.S. PATENT DOCUMENTS

| | | | | |
|---|---|---|---|---|
| 10,778,529 | B2* | 9/2020 | Aggarwal | H04L 45/22 |
| 2007/0286218 | A1* | 12/2007 | Zhang | H04L 41/145 |
| | | | | 370/401 |
| 2018/0329958 | A1* | 11/2018 | Choudhury | G06F 16/2456 |
| 2018/0351814 | A1* | 12/2018 | Aggarwal | H04L 41/145 |
| 2021/0006469 | A1* | 1/2021 | Aggarwal | H04L 41/145 |

FOREIGN PATENT DOCUMENTS

| | | |
|---|---|---|
| CN | 110830570 A | 2/2020 |
| CN | 106789253 B | 4/2020 |
| CN | 107395438 B | 4/2020 |
| GB | 2458540 A | 9/2009 |
| WO | 03/39070 | 5/2003 |

OTHER PUBLICATIONS

Daas, Mosheer J. et al. (Dec. 2019). "Energy Management Framework for 5G Ultra-Dense Networks Using Graph Theory," IEEE Access 7; 11 pages.

Li et al. (2022). "Can Pruning Improve Certified Robustness of Neural Networks?" 15 pages.

Morales, Fernando G. et al. (Jan. 2019). "Measuring and Improving Network Robustness: A Chilean Case Study," IEEE Communications Letters 22(1); 4 pages.

Oehlers (2021). "Graph Metrics for Network Robustness—A Survey" Mathematics 9, 895. (48 pages).

Simon, Marek et al. (Sep. 2017). "Combined Heuristic Attack Strategy on Complex Networks" Hindawi 2017 (24): 9 pages.

Soha et al., U.S. Office Action dated Apr. 26, 2023, directed to U.S. Appl. No. 17/956,425; 18 pages.

* cited by examiner

SYSTEMS AND METHODS FOR ASSESSING A COMPUTING NETWORK'S PHYSICAL ROBUSTNESS

CROSS-REFERENCE TO RELATED APPLICATIONS

This application is a continuation application of U.S. application Ser. No. 17/956,425, filed Sep. 29, 2022, the entire contents of which are incorporated herein by reference.

STATEMENT REGARDING FEDERALLY SPONSORED RESEARCH OR DEVELOPMENT

This invention was made with Government support under U.S. Government Contract No. FA8702-19-C-0001, awarded by the Department of Defense. The Government has certain rights in this invention.

FIELD OF THE DISCLOSURE

This disclosure relates systems and methods for assessing a computing network's physical robustness, and more specifically to an analytical framework that uses graph theory as the foundation for performing an analysis of worst-case failure scenarios on a computing network under analysis.

BACKGROUND OF THE DISCLOSURE

Physical connectivity of a computing network is a fundamental attribute of a computing system. Physical connectivity (i.e., the ability for one node on the computing system to send information to another node on the computing system over a physical connection) is a requirement upon which higher level connectivity services such as link layer, routing, message delivery are premised. If one computing node does not have a physical pathway to send data to another computing node, then higher-level connectivity services are moot since they are all predicated on needing a physical link to pass messages between the two nodes.

Computing networks generally comprise a plurality of computing nodes (i.e., computing machines) that are interconnected with each other through a plurality of physical connections (wired or wireless). In one or more examples, in order for two nodes of the network to be considered physically connected, either the two nodes are directly connected (i.e., they can transmit messages and data directly to one another) or they can be indirectly connected (i.e., they can pass messages and data to one another through other nodes and links). Due to the connectivity of computing nodes in a computing networks, a single node failure or link failure does not necessarily result in a loss of communication ability between two nodes of a computing system. In the event of a node failure, a given computing node may be able to transmit messages to other nodes in the network via alternative pathways within the computing network. However, as more and more nodes are removed from a given network, the likelihood that two nodes may lose the ability to communicate with one another will increase.

Thus, one goal of computing network design is to make the network resilient to the loss of nodes during operation so that communications between nodes are not compromised in the event of a node failure. Testing the "robustness" of the network to node failure, can ensure that in the event that nodes fail during operation of the network, the network can still operate as designed, albeit without the one or more malfunctioning nodes. A "brute force" method, wherein a simulation removes one or more nodes from a model of the computing network and then tests the network for connectivity can represent an NP hard problem that maybe computationally infeasible due to time and computing resource constraints. Thus, an analytical framework that avoids "brute force" methods of assessing physical network robustness, while also providing accurate results, can provide network planners and operators with a powerful and useful and pragmatic tool that can be utilized to ensure the reliable and resilient operation of a computing network even in the face of node failure during operation.

SUMMARY OF THE DISCLOSURE

Described herein are systems and methods for assessing a computing network's physical robustness to node and/or link failure during operation of the computing network. In one or more examples, the systems and methods can incorporate graph modeling and analysis techniques to assess the impact of node removal from a computing network and determine the impact that such removal has on the overall physical connectivity of the network. In one or more examples, a user or other entity can provide the system with a graph representation of a computing network, as well as specify the number of nodes to be removed (i.e., to simulate failure) to test the connectivity of the network. The system using these inputs can determine a worst-case scenario operating condition based on the inputs provided by the user, and can also assess the "network merit" which can represent a user-programmable definition that can represent a plurality of desired types of connectivity. In one or more examples, the outputs from the system and methods described herein can include: overall Network Merit of the degraded network and the number of isolated networks. In one or more examples, the overall Network Merit can represent the aggregate of the Network Merit for each of the isolated networks, as described in further detail below.

In one or more examples, the systems and methods described herein can employ Network Merit to capture the desired capability to be provided by the network. In one or more examples, the abstraction of network merit can allow for the system and methods to be programmable in terms of the desired communications requirements for the network. For instance, in one or more examples, a Network Merit score could include: (1) the network providing connectivity for Assets to one or more Controllers. As nodes are removed the initial network becomes fragmented comprising disjoint network clusters. For this case the overall Network Merit can be the sum of the individual Network Merit of each cluster (Assets being Operational or Isolated). For example, a disjoint cluster of 12 Assets with no access to Controllers would have a Network Merit of 12 Isolated Assets; (2) The network providing connectivity for all Assets to a quorum of Controllers (e.g., 3). In one or more examples, the overall Network Merit degrades from all Assets being Operational (access to 3 or more Controllers), to Degraded (Assets with access to 1 or 2 Controllers), to Isolated (Assets with no access to any Controller). The overall Network Merit can be the sum of the individual Network Merit of each cluster (Assets being Operational, Degraded, or Isolated); (3) The network providing connectivity to a group of at least 6 Assets. As nodes are removed Assets transition from Operational (groups of 6 or more) to Degraded (groups of 2 to 5 Assets) to Isolated (an isolated Asset); and (4) The combination of Asset-to-Asset connectivity (3) with Asset-to-Controller connectivity (1 or 2).

In one or more examples, the systems and methods described herein using the inputted graph and user's specification of the number of nodes to remove determines whether one or more bridges are present within the computing network. In one or more examples, a bridge can represent one or more nodes that when removed would separate the network into two or more disjoint (i.e., unconnected) networks. Thus, by identifying bridges and using the identified bridges as the nodes to be removed during a simulation of node removal, the assessment can maximize the probability that the worst-case situation is considered when a user specifies a specific number of nodes to remove for a given assessment of the computing network.

In one or more examples, the system and methods to perform the analysis described herein can be based primarily in graph theory, which is the study of mathematical structures that consist of nodes and edges that connect nodes called graphs. In one or more examples, graphs can be utilized to model connected components. In one or more examples, the graph theory approaches utilized can include connectivity analysis and min cut. In one or more examples, connectivity analysis can be used to determine which nodes are connected to each other and can be computed efficiently and easily using a traversal of the graph via depth first search. In one or more examples, connectivity analysis can be used for network analysis including computation of network merit.

Min cut is a graph theory method used to identify compute bridges, or minimum size node cuts that separate the graph. The min cut is a partition of the graph such that the number or capacity of the edges that connect the partitions are minimal. In one or more examples, the min flow max cut theorem states that the capacity of the edges in the min cut separating two nodes is equal to the max flow that can pass along the edges between those two nodes and we use this fact to compute bridges.

In one or more examples, the systems and methods described herein can use the input graph representation of the network to determine the identity of the minimum size bridges that can be cut from each network. In one or more examples, the systems and methods described herein after identifying the minimum size bridges can score each potential bridge. The specified Network Merit is used to score the impact of removing a candidate bridge. In one or more examples, scoring each potential bridge can include determining which bridges of the identified bridges are the most valuable towards achieving network merit (i.e., a worst-case scenario).

The method of identification of bridges is not sufficient in making the worst case analysis computationally feasible—it is still a combinatorial problem which requires exponential time. Thus, in one or more examples, the systems and methods described herein can employ a heuristic to determine which bridges are the most promising to pursue based on various scoring mechanisms. In one or more examples, the scoring mechanisms can include maximizing the number of isolated nodes, minimizing operational nodes, balancing clusters, and some weighted combination of the above three factors.

In one or more examples, once each of the bridges are scored, one or more of the identified bridges can be "pruned" from the space of bridges to be considered during the assessment, thus providing an achievable computational approach to determine worst case outcomes for a specific number of removals. In one or more examples, a predetermined heuristic pruning factor can be used to determine which of the bridges are to be considered during the assessment. Bridges that are identified as having low value (i.e., unlikely to yield negative network merit) can be pruned from consideration thereby reducing the search space of scenarios over which to consider the robustness of the network. In one or more examples, once pruning has been complete, the systems and methods can be iteratively run for each resulting network (after a bridge has been removed) and repeated until the number of nodes for removal specified by the user is reached. Once all of the possibilities have been explored, in one or more examples, the systems and methods can return the lowest merit outcome graph associated with the worst-case scenario as determined by the user programmed network merit.

In one or more examples, a method for assessing the physical robustness of a computing network comprises: generating a graph representation of a computing network, wherein the graph representation includes a plurality of nodes, wherein each node of the plurality of nodes corresponds to a computing device of the computing network, and wherein the graph representation includes a plurality of edges, wherein each edge of the plurality of edges represents a communication link between two or more computing devices of the plurality of computing device of the computing network, receiving a number of nodes to be removed from the generated graph, identifying one or more bridges within the generated graph, wherein a bridge of the one or more bridges comprises one or more nodes of the generated graph that when removed from the generated graph result in two or more disjoint networks, scoring the one or more identified bridges, wherein scoring the one or more identified bridges comprises generating a score for each identified bridge, determining a pruning factor, comparing the generated score for each identified bridge with the determined pruning factor, selecting one or more of the identified bridges based on the comparison of the generated score for each identified bridge with the determined pruning factor, removing the one or more nodes of the generated graph associated with the selected identified bridge to generate one or more resultant graphs, and determining a network merit score for the one or more resultant graphs.

Optionally, the method comprises: determining a network merit score based on the selected one or more identified bridges, and determining a lowest scored network merit of the one or more network merit scores associated with the one or more selected one or more bridges.

Optionally, determining a network merit score comprises receiving a network merit heuristic, and applying the received network merit heuristic to the generated one or more resultant graphs.

Optionally, the network merit heuristic comprises determining the number of reachable nodes for each node in the network.

Optionally, the network merit heuristic comprises determining the number of disjoint network clusters.

Optionally, identifying one or more bridges within the generated graph comprises: selecting a subset of nodes and edges from the generated graph, wherein the subset of nodes and edges form a connected graph, selecting a source node from the subset of nodes, selecting a sink node from the subset of nodes, and applying a maximum flow minimum cut process using selected subset of nodes and edges, the selected source node, and the selected sink node.

Optionally, the number of nodes and edges selected for the subset is based on the size of the generated graph.

Optionally, scoring the one or more identified bridges, comprises: receiving a scoring heuristic, removing one or more nodes associated with one or more identified bridges from the generated graph to generate a resultant graph; applying the scoring heuristic to the resultant graph, generating a score for the one or more identified bridges based on the applied scoring heuristic.

Optionally, the pruning factor is based on a processing load of a processor performing the method.

Optionally, selecting one or more of the identified bridges based on the comparison of the generated score for each identified bridge with the determined pruning factor comprises selecting one or more of the identified bridges if the generated score associated with the identified bridge is greater than the pruning factor.

Optionally, if a score associated with an identified bridge is not greater than the pruning factor, then removing the bridge from further consideration in the assessment.

In one or more examples, a non-transitory computer readable storage medium storing one or more programs is provided for assessing the physical robustness of a computing network, the programs for execution by one or more processors of an electronic device that when executed by the device, cause the device to: generate a graph representation of a computing network, wherein the graph representation includes a plurality of nodes, wherein each node of the plurality of nodes corresponds to a computing device of the computing network, and wherein the graph representation includes a plurality of edges, wherein each edge of the plurality of edges represents a communication link between two or more computing devices of the plurality of computing device of the computing network, receive a number of nodes to be removed from the generated graph, identify one or more bridges within the generated graph, wherein a bridge of the one or more bridges comprises one or nodes of the generated graph that when removed from the generated graph result in two or more disjoint networks, score the one or more identified bridges, wherein scoring the one or more identified bridges comprises generating a score for each identified bridge, determine a pruning factor, compare the generated score for each identified bridge with the determined pruning factor, select one or more of the identified bridges based on the comparison of the generated score for each identified bridge with the determined pruning factor, remove the one or more nodes of the generated graph associated with the selected identified bridge to generate one or more resultant graphs, and determine a network merit score for the one or more resultant graphs.

Optionally, the device is caused to: determine a network merit score based on the selected one or more identified bridges, and determine a lowest scored network merit of the one or more network merit scores associated with the one or more selected one or more bridges.

Optionally, computing a network merit score comprises: receiving a network merit heuristic, and applying the received network merit heuristic to the generated one or more resultant graphs.

Optionally, the network merit heuristic comprises determining the number of reachable nodes for each node in the network.

Optionally, the network merit heuristic comprises determining the number of disjoint network clusters.

Optionally, identifying one or more bridges within the generated graph comprises: selecting a subset of nodes and edges from the generated graph, wherein the subset of nodes and edges form a connected graph, selecting a source node from the subset of nodes, selecting a sink node from the subset of nodes, and applying a maximum flow minimum cut process using selected subset of nodes and edges, the selected source node, and the selected sink node.

Optionally, the number of nodes and edges selected for the subset is based on the size of the generated graph.

Optionally, scoring the one or more identified bridges, comprises: receiving a scoring heuristic, removing one or more nodes associated with one or more identified bridges from the generated graph to generate a resultant graph, and applying the scoring heuristic to the resultant graph, and generating a score for the one or more identified bridges based on the applied scoring heuristic.

Optionally, the pruning factor is based on a processing load of a processor performing the method.

Optionally, selecting one or more of the identified bridges based on the comparison of the generated score for each identified bridge with the determined pruning factor comprises selecting one or more of the identified bridges if the generated score associated with the identified bridge is greater than the pruning factor.

Optionally, if a score associated with an identified bridge is not greater than the pruning factor, then removing the bridge from further consideration in the assessment.

BRIEF DESCRIPTION OF THE FIGURES

The invention will now be described, by way of example only, with reference to the accompanying drawings, in which.

DETAILED DESCRIPTION OF THE DISCLOSURE

Figure 1:
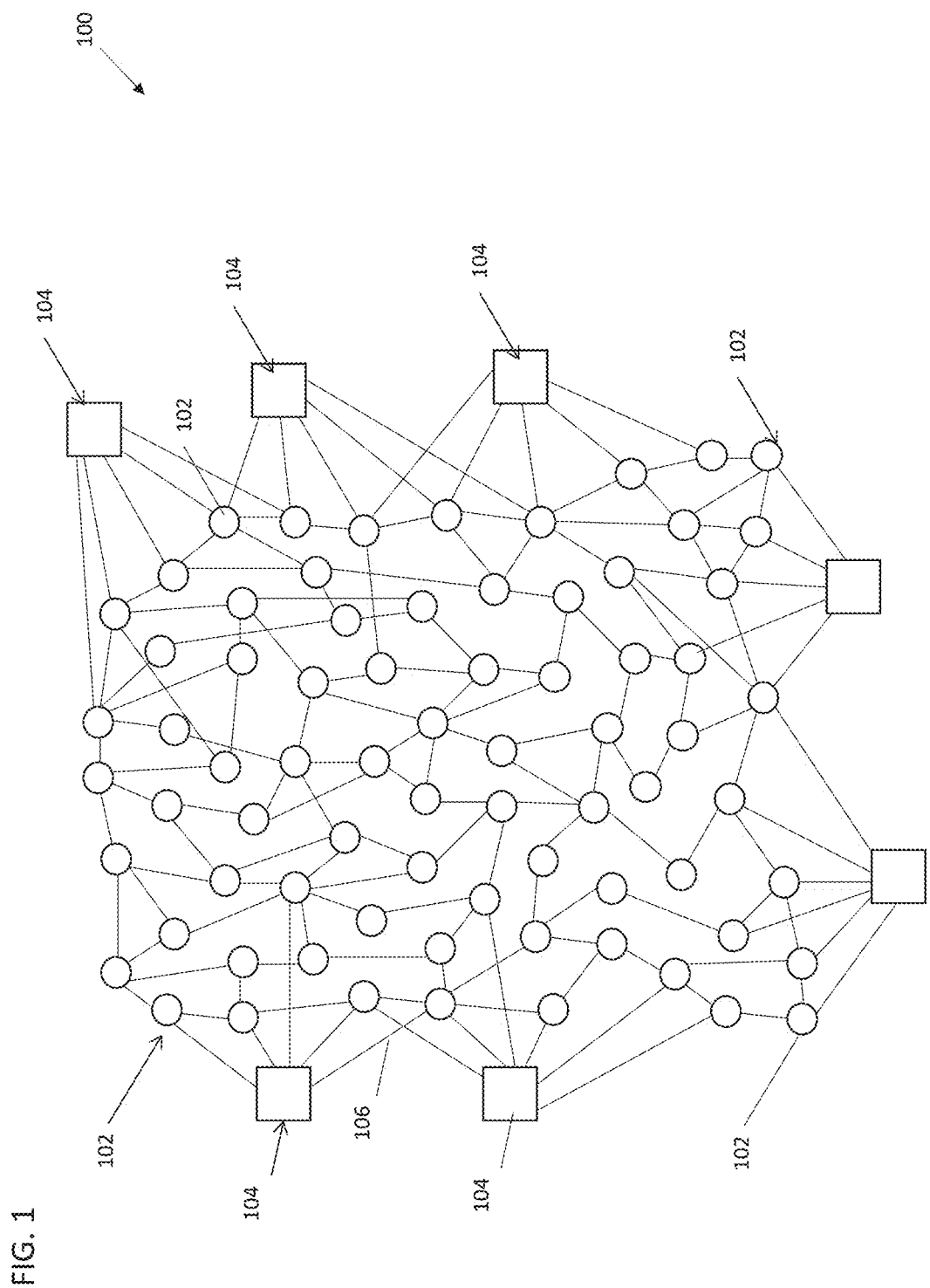
FIG. 1 illustrates an exemplary computing network according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for assessing a computing network's physical robustness, and specifically to detecting the network's ability to maintain a desired level of connectivity in the face of one or more failures of computing nodes within the computing network. In one or more examples, a user or other entity can input a graph representation of a computing network as well as specify a number of nodes to remove. In one or more examples, using these input parameters, the systems and methods described herein can identify one or more bridges of the computing network. Once the bridges have been computed, each bridge can be scored based on a pre-defined heuristic (i.e., Network Merit) specified by the use or the system. In one or more examples, pruning can refer to removing scored bridges from consideration based on its score.

In one or more examples, identifying bridges can include utilizing a minimum cut, maximum flow method to identify bridges. In one or more examples, the minimum size bridges can have sizes that are equal to the connectivity of the entire graph, and thus the connectivity of the entire graph can be first assessed to determine the minimum size of the bridges. In one or more examples, a subset of the vertices of the input network can be selected, the process can find all minimum size bridges between these nodes and all other nodes in the network. In one or more examples, once the bridges have been identified, each bridge can be scored. In one or more examples, scoring each potential bridge can include determining which bridges of the identified bridges are the most valuable towards minimizing network merit (i.e., a worst-case scenario). Thus, in one or more examples, the systems and methods described herein can employ a heuristic to determine which bridges are the most promising to pursue based on various scoring mechanisms. In one or more examples, the scoring mechanisms can include minimizing Network Merit (e.g., the number isolated nodes, minimizing operational nodes), balancing clusters, and some weighted combination of the above three factors.

In one or more examples, once each of the bridges are scored, one or more of the identified bridges can be "pruned" from the space of bridges to be considered during the assessment. In one or more examples, a pre-determined heuristic pruning factor can be used to determine which of the bridges are to be considered during the assessment. Bridges that are identified as having low value (i.e., unlikely to yield negative network merit) can be pruned from consideration thereby reducing the search space of scenarios over which to consider the robustness of the network. In one or more examples, once pruning has been complete, the systems and methods can be iteratively run for each resulting network (after a bridge has been removed) and repeated until the number of nodes for removal specified by the user is reached. Once all of the possibilities have been explored, in one or more examples, the systems and methods can return the lowest merit outcome graph associated with the worst-case scenario as determined by the user programmed network merit.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

With advances in computing technology as well as advances in the ability of computers to communicate with one another over long distances and with rapid speeds, modern-day computing networks are often a large interconnected network of computing resources spread over many different physical locations. FIG. 1 illustrates an exemplary computing network according to examples of the disclosure. In one or more examples, the system 100 of FIG. 1 represents a computing network that includes a plurality of computing nodes that are interconnected with one another through either direct physical links between nodes or through indirect links between nodes (described in further detail below).

In one or more examples, the computing network 100 of FIG. 1 can include a plurality of computing nodes 102 and a plurality of controllers 104. In one or more examples, the controllers (or control centers) 104 can include one or more computing resources or devices that are configured to provide commands and can control the operations of the one or more computing nodes 102. Computing nodes 102 can represent systems that are configured to perform a task or set of tasks when commanded by the control centers 104. In one or more examples, each computing node 102 can be either directly connected to one or more control centers 104, indirectly connected to one or more controllers (i.e., with other computing nodes 102 intervening between a control center 104 and a computing node 102), or a computing node can be both directly and indirectly connected to one or more control centers 104.

In one or more examples, each computing node can be interconnected with the other computing nodes 102 and control centers 104 via one or more physical connections 106 between computing nodes 102. In one or more examples, the computing nodes 102 and control centers 104 can communicate to other computing nodes and control centers either through a direct physical connection or indirectly by relaying their communications through other nodes 102 and control centers 104. Thus, in one or more examples, any control center 104 can communicate with any computing node 102 in the network, by using any intervening computing nodes and/or control centers as relays that can receive the message and then pass it to another computing node/controller that has a direct physical connection. Thus, in one or more examples, so long as a path can be drawn from one computing node/controller to another through the network, the two components can be said to be in communication with one another.

As described above, each control center 104 can control each of the computing nodes 102 that are directly connected to and part of the physical location associated with the control center. However, in one or more examples, each control center 104 can also control other computing nodes 102 associated with other physical locations so long as the control center has a physical path by which it can transmit messages to the other nodes. In one or more examples, each and every computing node 102 of the system 100 can be considered operational if it has a physical connection or pathway to one of the control centers 104 of the system 100. In one or more examples, a computing node could be required to be connected to two or more control centers in order to be considered operational so as to ensure operational continuity in the event that one control center's communications are compromised.

In one or more examples, the system 100 described above can be resilient in the event of node or control center failure. For instance, if a control center 104 of the network 100 is removed from the network (i.e., the control center is no longer operational), then the computing nodes 102 can still be considered operational because if they still have physical connections to each of the other control centers 104 in the network 100. However, in one or more examples, as more and more nodes 102 are removed from the system 100, at some point, one or more of the computing nodes 102 of the system may no longer be considered operational because they may no longer have a physical connection (i.e., pathway) between to the requisite number of control centers 104.

In one or more examples, when designing a computing system such as computing system 100, one of the design goals of such a system can be to make the system robust to node removals. In other words, the system can be designed so that it can still maintain the operational status of each computing node despite node removal. In one or more examples, the robustness of a network can be assessed for instance by looking at node removal vs. operational computing nodes. In other words, if a certain number of nodes are removed from the network (due to malfunction or physical damage) how many of the remaining nodes will still have an operational link to one or more control center nodes. In an example system which simply has a plurality of computing nodes (i.e., no control centers required), an operational node can be defined as a node that has connectivity to a pre-defined number of other nodes in the network.

Assessing how robust a particular network design is to node or link remove can present many challenges. For instance, a straightforward way of examining the effects of node removal can include an exhaustive search of all possible outcomes and manually analyzing each outcome to determine how many operational nodes are present in the network. In one or more examples, in a 150 node network for example, if a user wants to assess the robustness of the network to the removal of 50 nodes from the network, then using the method described above, every possible set of 50 nodes in the network of 150 nodes would constitute a separate outcome. Thus, for a single outcome, the set of 50 nodes of 150 nodes pertaining to the outcome would have to be removed, and each of the remaining nodes in the network (i.e., the remaining 100 nodes) would need to be analyzed to determine how many of the remaining nodes were still operational after the 50 nodes were removed. In the example of removing 50 nodes from a 150 node network, there would be $150!/(50!)(100!)$, or $2 \times 10^{40}$ possible outcomes. In one or more examples, rather than exhaustively analyze each possible outcome, the number of outcomes to be analyzed can be lessened by simply analyzing random outcomes to determine an average of operational nodes, however in the event that a user wants to know what the worst case outcome is (i.e., which set of 50 nodes will yield the most non-operational nodes) then an exhaustive search of every outcome would be required. Thus, the "brute force" analysis method described above may not be feasible due to the time and computational resources required to complete the analysis.

In one or more examples, and as described in detail below, the computational problem described above cannot be mitigated by representing a computing network as a graph alone. One must also employ various heuristics to provide a computational solvable approach to determine network robustness (i.e., ability to remain operational in the face of node removals). In one or more examples, employing a graph approach and heuristics to analyzing network robustness can allow for the worst-case outcomes relating to the removal of a particular outcome to be considered without having to manually search for them, thereby reducing the number of outcomes needing to be considered, which in turn can reduce the computation complexity and time needed to make an assessment.

Figure 2:
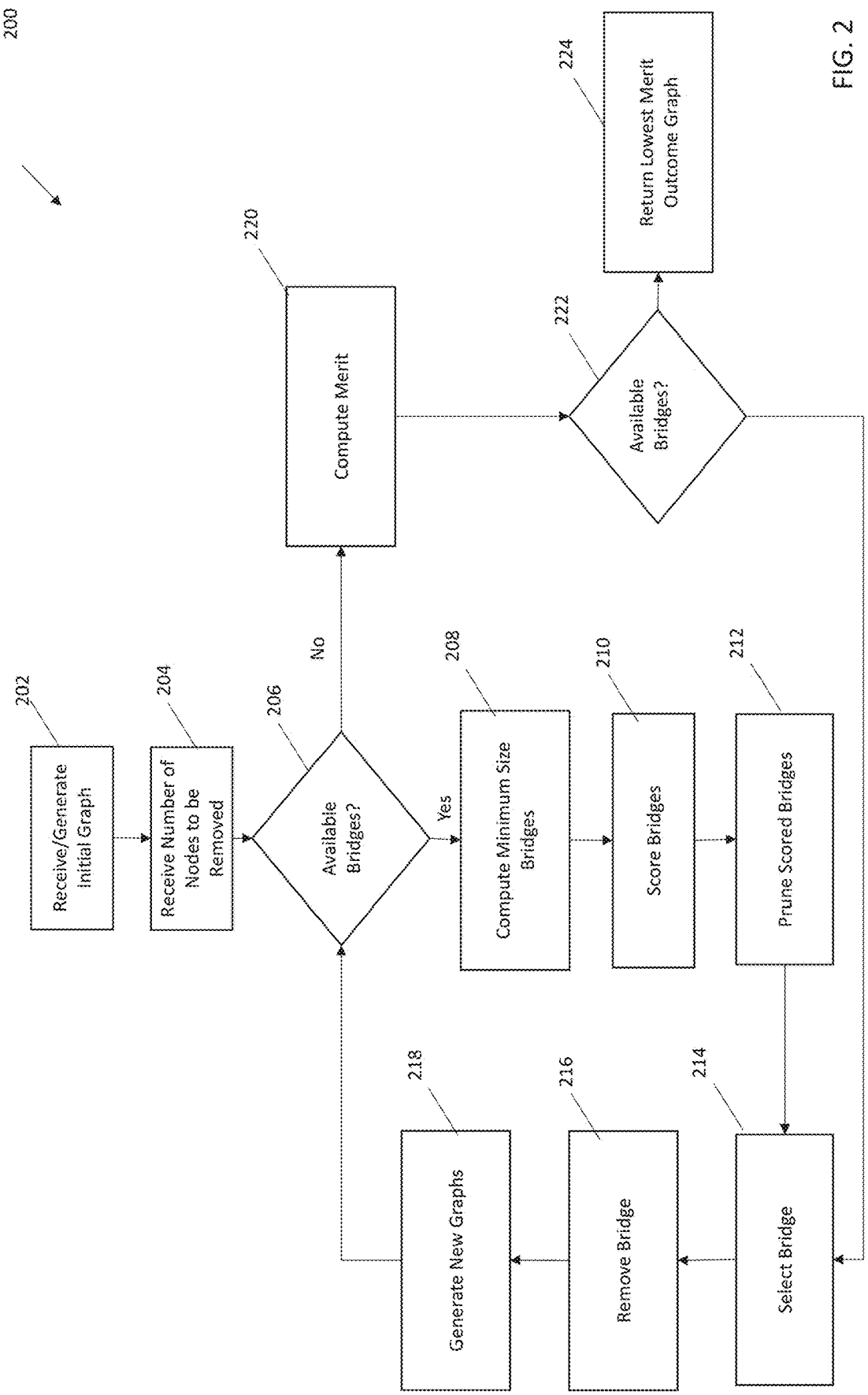
FIG. 2 illustrates an exemplary method assessing physical robustness of a network according to examples of the disclosure.

FIG. 2 illustrates an exemplary method assessing physical robustness of a network according to examples of the disclosure. In one or more examples, the process 200 of FIG. 2 can represent an exemplary process for assessing the "worst-case" connectivity of a network given the removal of a pre-defined number of nodes. In one or more examples, a "worst-case" scenario can refer to the removal of a given number of nodes leading to the maximum number of remaining nodes that are deemed non-operational. As described above, the number of nodes that become non-operational due to a particular number of node removals can depend on the particular nodes that are removed. For instance, in the example of removing 50 nodes in a 150 node network, the number of operational nodes remaining may depend on which nodes of the 150 nodes have been removed. Thus, finding the worst-case scenario can refer to finding a specific combination of 50 nodes of the 150 node network which creates the most non-operational nodes. As discussed in further detail below, the definition of an "operational node" can be user-defined. Alternatively or additionally, rather than determining a worst-case scenario for node operability, the process 200 can also be used to determine any maximum or minimum configuration of node removals based on a connectivity related user defined metric as defined in further detail below.

Figure 3:
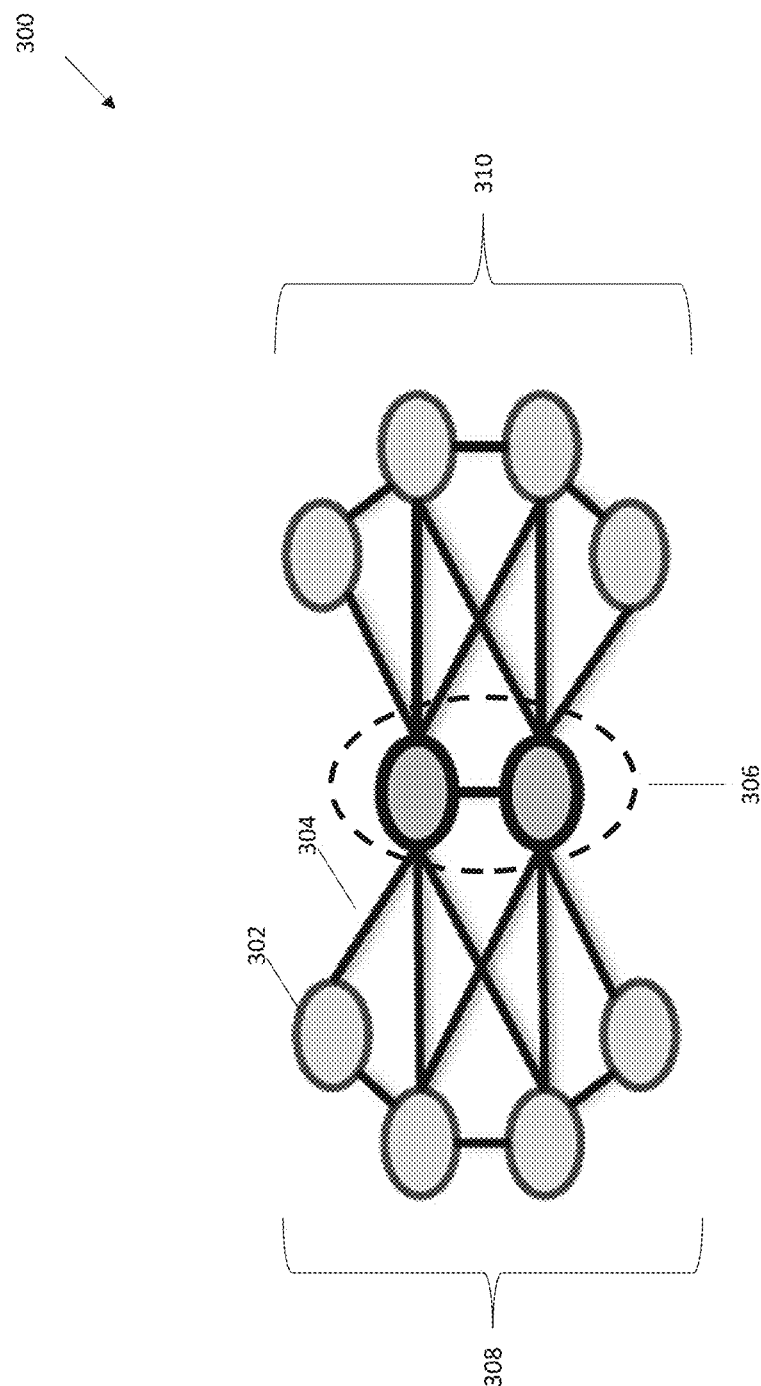
FIG. 3 illustrates an exemplary bridge of a computing network according to examples of the disclosure.

In one or more examples, the process 200 can begin at step 202 wherein the process can receive a graph representation of a computing network to be analyzed. In one or more examples, a "graph" can refer to a structure consisting of vertices (i.e., nodes) and edges. In one or more examples, a computing network can be represented using a graph by representing any computing devices or components of the network as a vertex/node in the graph, and representing any physical connections between computing devices as edges (i.e., lines connecting the nodes). FIG. 3 illustrates an exemplary graph representation of a computing network according to examples of the disclosure. In one or more examples, the graph 300 of FIG. 3 illustrates an exemplary graph representation of a computing network that includes one or more nodes 302 and edges 304. In one or more examples, by representing the computing network as a graph or accepting graph representations of a computing network at its input, the process 200 is able to use graph theory concepts and analysis techniques that can minimize the computational complexity and time required to assess the physical robustness of the computing network.

Returning to the example of FIG. 2, once the graph representation of the computing network to be analyzed at step 202, the process 200 can move to step 204 wherein a number of nodes to be removed can be received. In one or more examples, the process 200 can be implemented as a software program that can include one or more user interfaces that can be configured to receive user inputs. Thus, at step 204, the number of nodes to remove for the purposes of examining a computing network can be received from a user of the program that is being used to implement process 200. Additionally or alternatively, the number of nodes to be removed can be pre-defined such that the act of receiving the number at step 204 can represent obtaining the pre-defined number from a memory in the computing system being used to implement process 200. In one or more examples, steps 202 and 204 can be performed in any order or can be performed in parallel.

In one or more examples, once the graph and the number of nodes have been received, the process 200 can move to step 206 wherein the graph is analyzed to determine whether the graph contains one or more bridges. In one or more examples, a bridge is a set of one or more nodes in the graph that if cut and/or removed cause the graph to form two separate disjoint (i.e., unconnected) portions, with each portion representing its own network. Returning to the example graph 300 of FIG. 3, the network represented by graph 300 can include a bridge 306. In one or more examples, bridge 306 can include 2 nodes of the graph 300, that when removed would cause the graph to form two separate and disjoint networks 308 and 310 that are not connected to one another. In one or more examples, rather than going through each and every combination of nodes for removal from a network to find the worst-case outcome, by identifying sets of nodes that include bridges as part of the combination of nodes, the nodes that would likely have the largest impact to network operations can be identified and removed to determine the worst-case scenario. In one or more examples, a strategy for determining the worst-case scenario embodied by the process 200 of FIG. 2 can include focusing on node removal that will sever the computing network into multiple clusters with the fewest nodes (i.e., smallest bridges) possible. In one or more examples, the strategy can further include creating as many "islands" (i.e., disjoint networks) that cannot communicate with each user using the node removal budget (i.e., the number of nodes to remove) received at step 204.

Thus, at step 206, in one or more examples, the process 200 can perform an analysis of the graph received at step 202 (or other steps as discussed in detail below) to determine if any bridges can be cut from the received graph. For instance, in one or more examples, the graph could be analyzed using the Tarjan algorithm or any other algorithm used in graph theory to identify the bridges in a given graph. In one or more examples, if it is determined at step 206 that the received graph contains one or more bridges, then the process 200 can move to step 208 wherein minimum size bridges are identified for further analysis. A "minimum size" bridge can refer to a bridge that has the least amount of nodes required to form a disjoint or unconnected network in the graph. For instance, if there are two nodes in the graph that when removed together cause the formation of two separate networks, in which nodes of one network no longer can communicate with nodes of the other network, then the minimum size bridge will be two. Returning to the example of the graph 300 of FIG. 3, bridge 306 can include 2 nodes that when removed from the graph 300 will create two disjoint networks 308 and 310. Since there are no nodes in graph 300 that when individually removed create two unconnected networks, the minimum bridge size of graph 300 can be two nodes.

Figure 4:
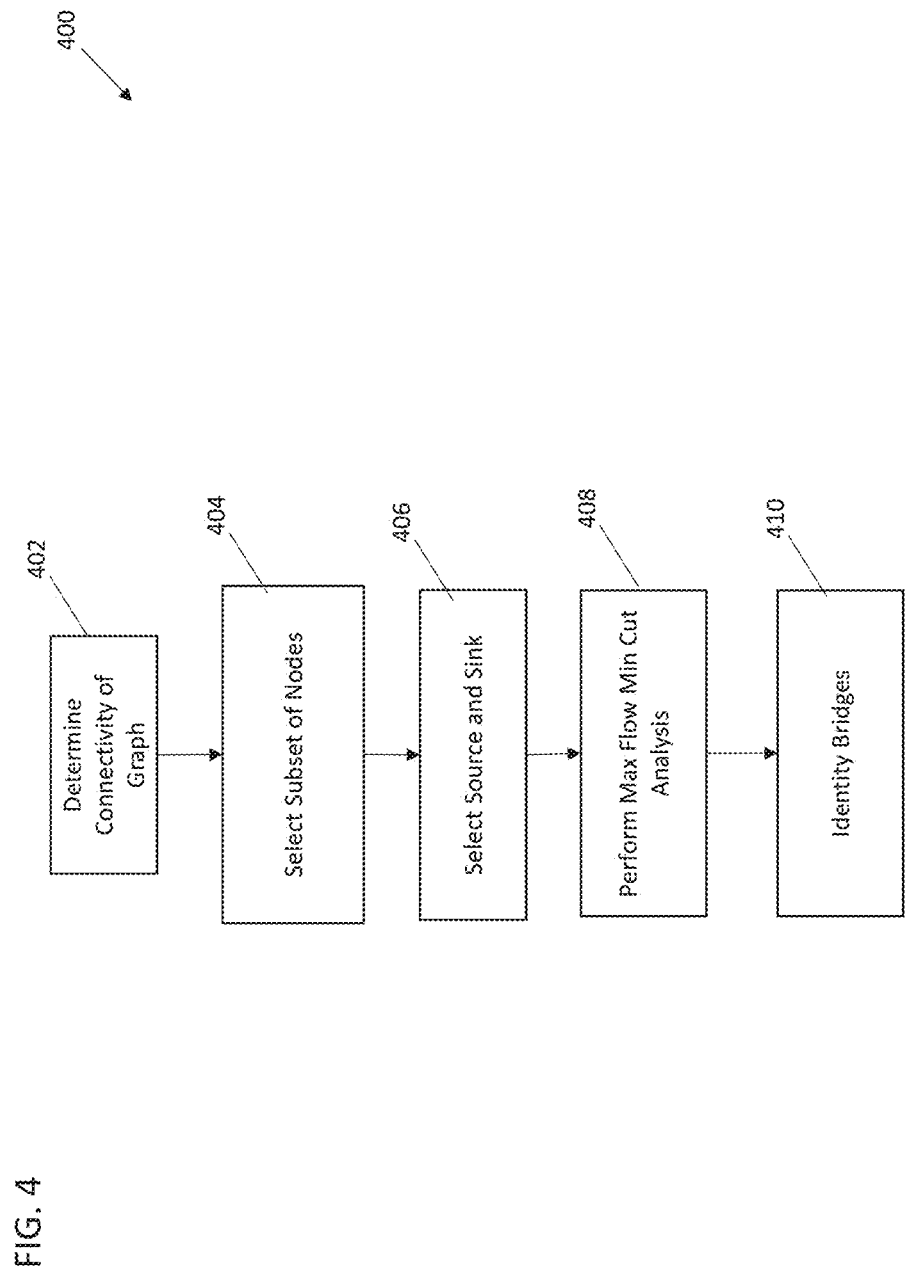
FIG. 4 illustrates an exemplary method for computing minimum size bridges according to examples of the disclosure.

In one or more examples, finding the minimum size bridges can incorporate or include using a min cut/max flow method based on the Kanevsky algorithm for determining minimum size bridges. As discussed below, one important observation provided by the Kanevsky algorithm is that the minimum size bridges have sizes equal to the connectivity of the overall graph. Thus, determining the size of a minimum size bridge can include determining the overall connectivity of the graph. FIG. 4 illustrates an exemplary method for computing minimum size bridges according to examples of the disclosure. In one or more examples, and as discussed above, the process 400 of FIG. 4 can begin at step 402 wherein the connectivity of the graph being analyzed is determined. In one or more examples, computing the connectivity of the graph can be done using a variety of algorithms which can be performed efficiently in polynomial time. In one or more examples, connectivity (i.e., vertex connectivity) can refer to the minimum number of nodes that are needed to be removed before an undirected and connected graph becomes unconnected (i.e., there are two or more nodes who cannot communicate with each other). In one or more examples, the nodes of a bridge are required to be directly connected to one another (i.e., a path can be drawn between nodes of the bridge without traversing a non-bridge node) whereas the connectivity of the graph can be determined using non-contiguous sets of nodes.

In one or more examples, once the connectivity of the graph is determined at step 402, the process 400 can move to step 404 wherein a max flow/min cut analysis can be initiated by first selecting a subset of the nodes and edges in the graph for further analysis. In one or more examples at step 402, a subset of k vertices (i.e., nodes) of the input graph of maximum degree can be selected to minimize work since the analysis does not need to be performed for adjacent nodes; no bridge can separate them since they are already connected. Thus, in one or more examples, at step 404, a subset K of the vertices and edges of the graph are selected, wherein the size of K is chosen so as to minimize the work needed to perform the max flow min cut analysis.

In one or more examples, once the subset K of the graph is chosen at step 404, the process 400 can move to step 406 wherein two nodes out of the subset K can be chosen, wherein one of the chosen nodes can be designated as a source node, and the second chosen node can be designated as the sink node. In one or more examples, the source node can represent the source in a max flow analysis, while the sink node can represent the destination for signals sent by the source. In one or more examples, once the source and the sink nodes have been chosen from the set K at step 406, the process 408 can move to step 410 wherein the max flow min cut algorithm based on the Edmonds-Karp algorithm can be implemented using the subset K and the designated source and sink nodes. In one or more examples, and as described in further detail below. Min cut can be used in the worst case algorithm (i.e., finding the worst case scenario for a certain number of node removals) to compute bridges, or minimum size node cuts that separate the graph. In one or more examples, the min cut can be used to partition a graph such that the number or capacity of the edges that connect the partitions are minimal. In one or more examples, the max-flow min-cut theorem states that the capacity of the edges in the min cut separating two nodes is equal to the max flow that can pass along the edges between those two nodes. In one or more examples, and for the purposes of the process 400 of FIG. 4, each edge of the subset K of a graph can be assumed to have a capacity of one. Thus, in one or more examples, Min cut can be computed with the Edmonds-Karp algorithm which is a greedy algorithm that works by computing the shortest paths from the source to the sink node and adding flow along those paths in order, until all edges are at capacity. The algorithm does use a residual graph to allow flow to be pushed back along edges. The algorithm continues until there is no path from the source to the sink node with capacity. In one or more examples, once the max flow min cut analysis is performed on the subset K (using the source and sink nodes selected at step 406), the process can be iterated the results of the analysis produced at step 408 can be used to identify all of the bridges of the minimum size determined at step 402 in the original graph at step 410.

Returning to the example of FIG. 2, once the bridges of the graph have been identified at step 208, the process 200 can move to step 210, wherein each bridge that is identified is scored. In one or more examples, scoring a bridge can refer to assessing a particular bridge for how likely the removal of that bridge will be to result in the worst-case Network Merit when simulating node removals. In other words, a bridge that will likely have a high impact to the operational status of the nodes remaining in the graph when the nodes associated with the bridge are removed. In one or more examples, and as discussed in further detail below, it may not be computationally feasible to determine the effect of removing every single bridge identified at step 208, and thus, by scoring each bridge, i.e., determining how a bridge may have an impact on network robustness, certain bridges can be "pruned" (i.e., not considered for the worst-case node removal scenario) thereby lowering the overall computational cost associated with the assessment of the network. In one or more examples, and as described in further detail below, the scoring process can employ a user-defined heuristic to score each bridge determined at step 208. Thus, the user can define a scoring heuristic that is likely to have the most significant impact in the pursuit of 2 goals: (1) to accurately identify the worst-case node removal scenario; and (2) to provide a computationally feasible approach to determine network robustness.

Figure 5:
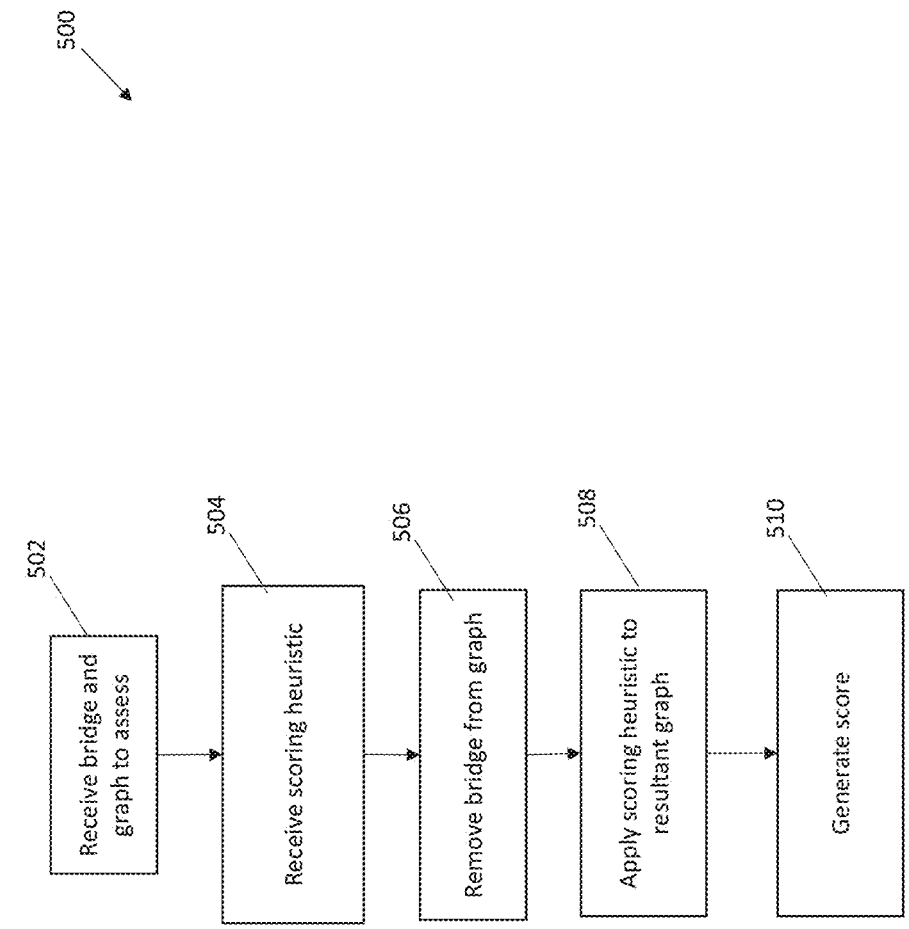
FIG. 5 illustrates an exemplary process for scoring bridges according to examples of the disclosure.

FIG. 5 illustrates an exemplary process for scoring bridges according to examples of the disclosure. In one or more examples, the process 500 of FIG. 5 provides an exemplary method for determining a score for a particular bridge identified at step 208 of process 200 of FIG. 2. In one or more examples, the process 500 of FIG. 5 can begin at step 502 wherein a bridge generated identified at step 208 of FIG. 2 is received. In one or more examples, in addition to the bridge, the graph to which the bridge is associated can also be received. Once the bridge and graph have been received at step 502, the process 500 can move to step 504 wherein one or more scoring heuristics are received from a user or other entity. In one or more examples, a scoring heuristic can refer to a function, algorithm, or metric that can be used to apply a score a bridge received at step 502. In one or more examples, the scoring heuristic can be selected or designed by the user so as to maximize the likelihood that the bridge or bridges that will be included in to the worst-case scenario of a particular number of nodes to be removed will be selected. In one or more examples, the scoring heuristic can be configured to maximize the number of isolated nodes created by a bridge. In other words, the more isolated nodes in a resultant graph created by removing nodes that are generated the higher the score for the bridge will be.

In one or more examples, the scoring heuristic can be configured to minimize Network Merit (e.g., the number of operational nodes). In other words rewarding graphs that are generated from bridge removal that include a large number of non-operational nodes (i.e., as defined by the merit metric discussed in detail below, or as defined by the user). Using the example of FIG. 1 above, a non-operational node can refer to a node that is not connected to any control center nodes. In one or more examples, the scoring heuristic can be configured to reward balanced clusters. In other words, the resultant graphs that are generated when a bridge is removed have equally sized separate clusters. The more balanced the resultant graphs, the higher the bridge is scored. In one or more examples, the scoring heuristic can be a weighted average of one or more of the example scoring heuristics described above. The example scoring heuristics described above are meant as examples only and should not be seen as limiting to the disclosure. In one or more examples, the scoring heuristics received at step 504 can include any heuristic that is configured to identify bridges that are more likely to be part of a worst-case node removal scenario. In other words, the bridge that is being scored will likely include the nodes that are part of the nodes removed when assessing the network. Returning to the example of FIG. 2, the scoring heuristic of step 504 can represent any scoring function that is likely to identify if a specific bridge will be part of the nodes that make up the number of nodes to be removed received at step 204 so as to generate the worst-case scenario. For instance if a graph includes 150 nodes, and 50 nodes are specified to be removed at step 204, then the scoring heuristic can help to determine the likelihood that a specific bridge will be part of the 50 nodes to be removed that will generate the worst-case scenario.

Once the heuristic is received at step 504, the process 500 can move to 506, wherein the bridge received at step 502 is removed from the graph. Once the bridge has been removed at step 506 from the graph, a resultant set of graphs will be created since the identified bridge will create two separate networks that are disjoint from one another as discussed above with respect to FIG. 3. Once the resultant graph has been generated at step 506 by removing the bridge received at step 502, the process 500 can move to step 508 wherein the scoring heuristic received at step 504 can be applied to the resultant set of graphs created by the removal of the bridge at step 506. In one or more examples, once the scoring has been applied to the resultant graph at step 508, the process 510 wherein a score is generated using the scoring heuristic applied at step 508. Thus, in one or more examples, the process 500 of FIG. 5 can end with a score for the bridge being assessed, which as discussed in further detail below can be used to prune one or more bridges from consideration when assessing the overall physical robustness of the network.

Returning to the example of FIG. 2, once all of the bridges identified at step 208 have been scored at step 210, the process 200 can move to step 212 wherein one or more bridges at step 208 can be pruned based on their score determined at step 210. Pruning can refer to the process of excluding or removing certain bridges from consideration when determining the worst-case scenario because the bridge will likely not be part of the worst-case node removal scenario. In one or more examples, determining what bridges to prune from consideration can be a dynamic process that depends on a variety of factors such as computing time, the number of graphs that can be considered at each iteration of the process 200, and other factors that have to do with the computational time and complexity required to assess all of the bridges identified by the process 200 for inclusion in a worst-case scenario.

Figure 6:
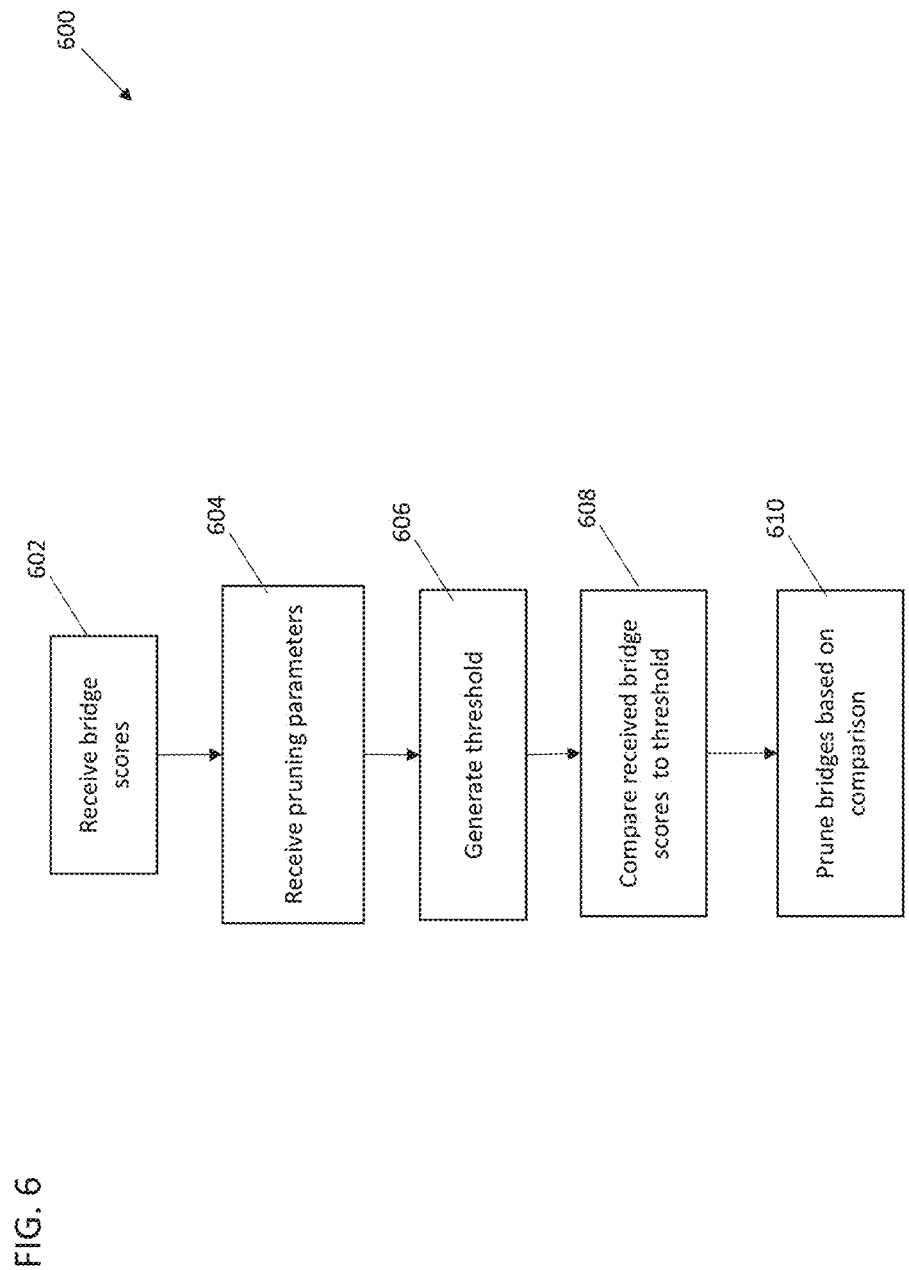
FIG. 6 illustrates an exemplary pruning process according to examples of the disclosure.

FIG. 6 illustrates an exemplary pruning process according to examples of the disclosure. In one or more examples, the process 600 of FIG. 6 can begin at step 602 wherein one or more bridge scores are received at step 602. In one or more examples, the bridge scores received at step 602 can include all of the bridges associated with a particular graph identified at step 208 and generated using the process 500 of FIG. 5. In one or more examples, once the bridge scores have been received at step 602, the process 600 can move to step 604 wherein the parameters that will be used to determine a pruning factor can be received. In one or more examples, the pruning parameters can include any parameters that may be used to generate a pre-determined threshold for comparing scored bridges against as discussed below. In one or more examples, the pruning parameters can include computation time (i.e., the time indicated by the user that they want the assessment to take), the number of graphs to be considered, and any other factors that could affect the total computation time for the assessment performed by the process 200 of FIG. 2. In one or more examples, and as discussed below, the parameters received at step 604 can be used to determine a dynamic pruning factor that can be adjusted as the assessment of a physical network is being performed.

In one or more examples, once the pruning parameters have been received at step 604, the process can move to step 606 wherein the pruning parameters are used to determine a threshold by which the scored bridges can be compared to determine which bridges will be selected for further assessment. In one or more examples, the pruning factor determined at step 604 can be dynamically calculated at each point in which pruning may be required during the assessment and can be based on dynamic factors such as processing load of a process, current processing times of the processor, and the number of graphs that have already been considered by the process 200. In one or more examples, the threshold determined at step 606 can be calculated so as to balance the number of bridges considered in the assessment vs. the amount of time desired to complete the analysis. A smaller threshold will allow for a more accurate assessment of the network, but will increase the amount of time needed to complete the assessment. Thus, in one or more examples, the threshold calculated at step 606 can be selected to balance the two tradeoffs based on the user's preferences.

In one or more examples, once a threshold has been generated at step 606, the process 600 can move to step 608 wherein each of the scores received at step 602 can be compared against the threshold. In one or more examples, step 608 can include determining which of the bridge scores are greater than the threshold and which of the bridge scores are below the threshold determined at step 608. In one or more example, once each score has been compared against the threshold generated at step 606, the process 600 can move to 610, wherein each bridge whose score fell below the threshold at step 608 can be pruned (i.e., removed) from consideration during the assessment. In this way, only the bridges that are most likely to yield a worst-case scenario in terms of merit can be retained and assessed thereby conserving computing resources and ensuring that the assessment can complete in a timely manner with a high-degree of accuracy.

Returning to the example of FIG. 2, once the bridges that fail to score above the pruning factor have been removed at step 212, the process 200 can move to step 214 wherein the one of the bridges remaining after pruning at step 212 can be selected for further analysis. In one or more examples, once the bridge has been selected at step 214, the process can move to step 216 wherein the bridge is removed from the graph. After removing the bridge at step 216, in one or more examples, two or more resultant graphs can have been created at step 218 since removing a bridge by definition will cause two or more disjoint networks to be left after the removal. Thus, once the new graphs have been generated at step 218, the process can revert back to step 206 wherein the generated graphs can be assessed to determine if those graphs have any available bridges using the process described above with respect to the discussion of step 206 as described above. The process 200, can be an iterative process meaning it can be repeated for each graph generated at step 218. Thus, the graphs created by removing a bridge can each be assessed themselves to determine the identities of one or more bridges, and those bridges can go through the same scoring and pruning process described above. Each time a new bridge is identified from a resultant graph stemming from the removal of a previously defined bridge the total number of nodes found in each bridge of the iteration can be added to keep track of the number of nodes that have been removed from the original graph received at step 202, and the process can keep iterating until the total number of nodes to removed received at step 204 is hit. Thus, in one or more examples, determining if there are any available bridges at step 206 can also include determining if the number of nodes to be removed has been reached, meaning that the assessment cannot go further. The totality of bridges to be considered during the assessment can represent a search space that can be pruned to reduce the total amount of time it takes to complete an assessment.

Figure 7A:
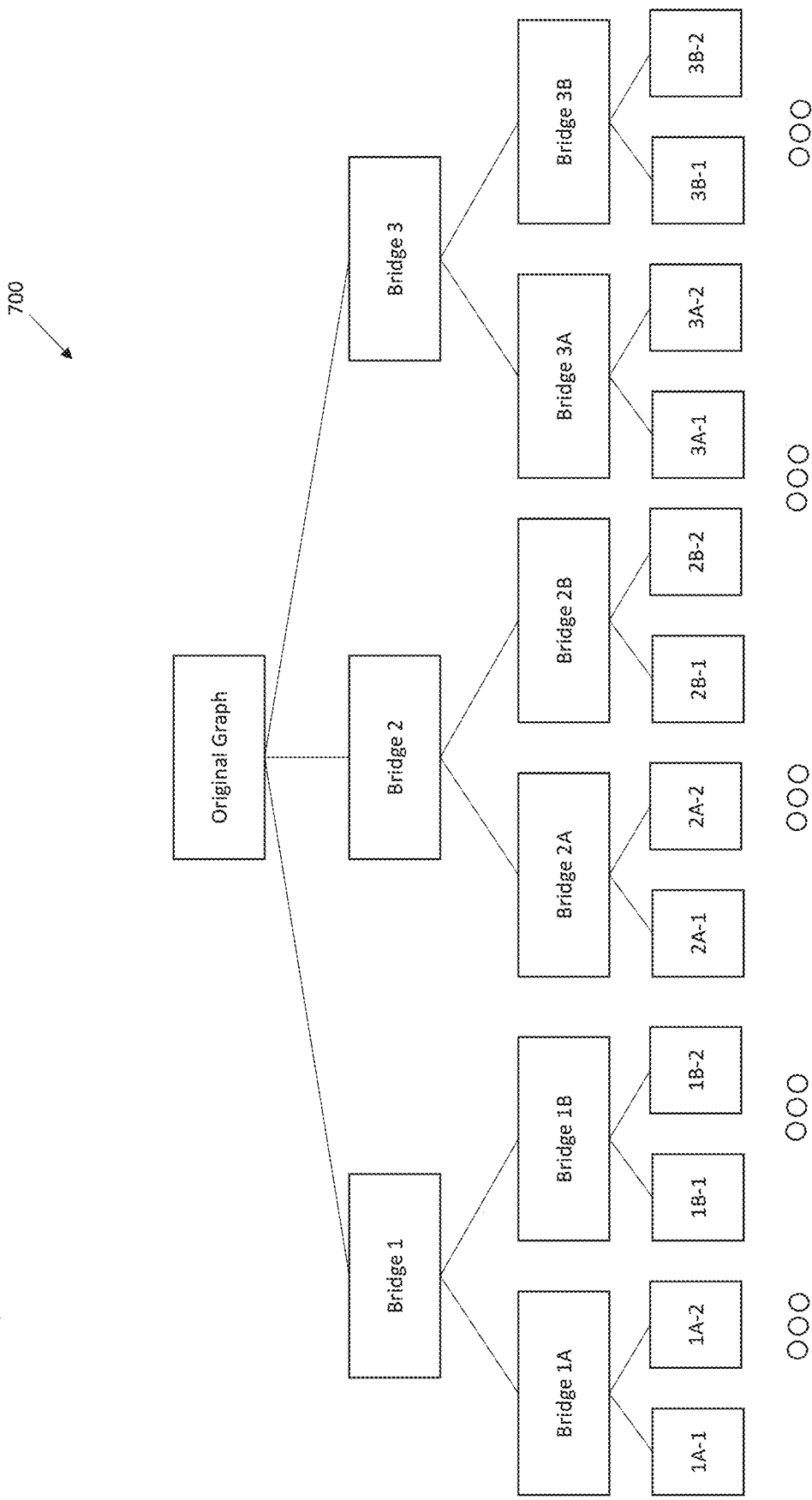
FIGS. 7A-7D illustrate an exemplary pruned search spaces according to examples of the disclosure
Figure 7B:
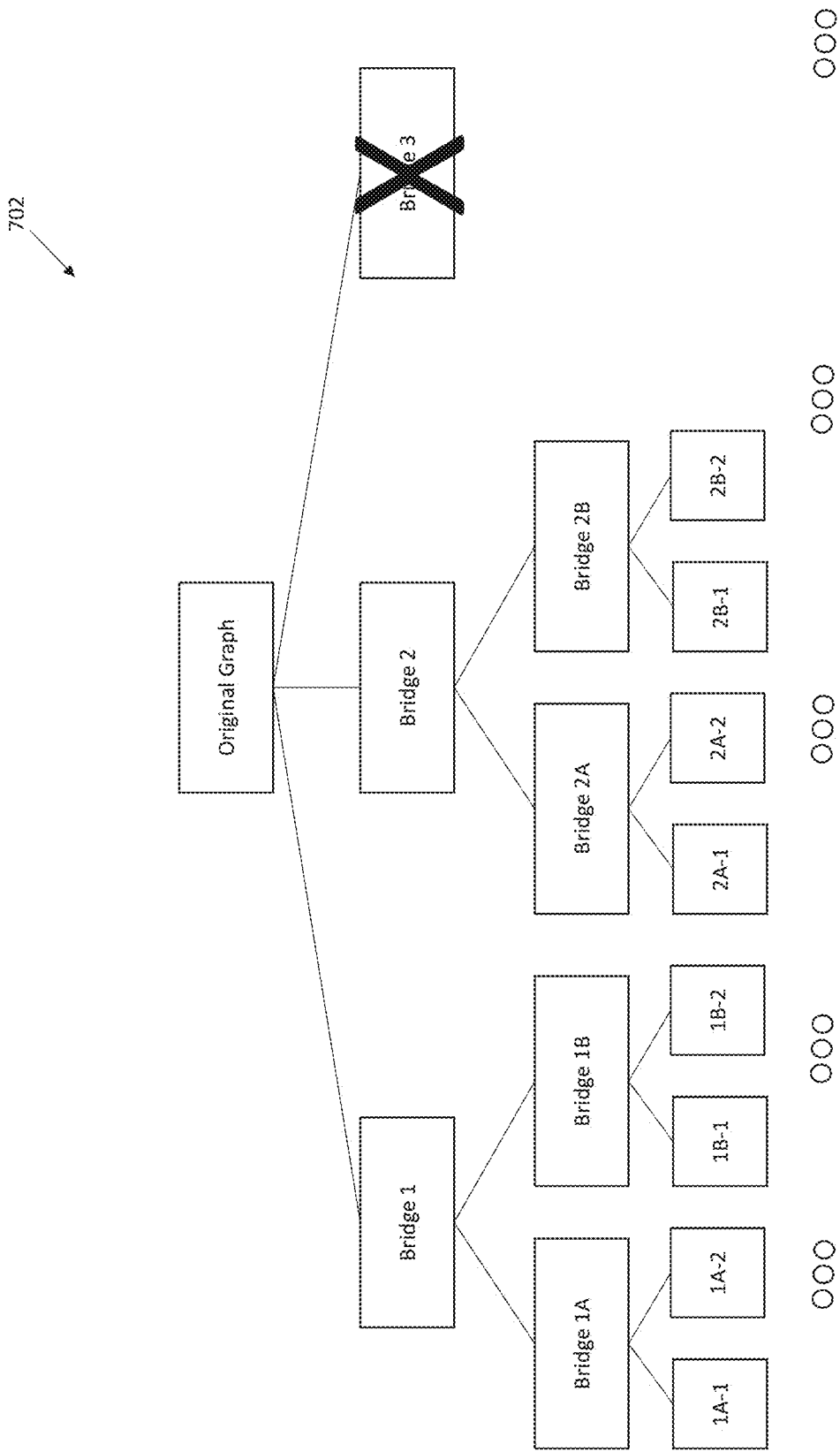
Figure 7C:
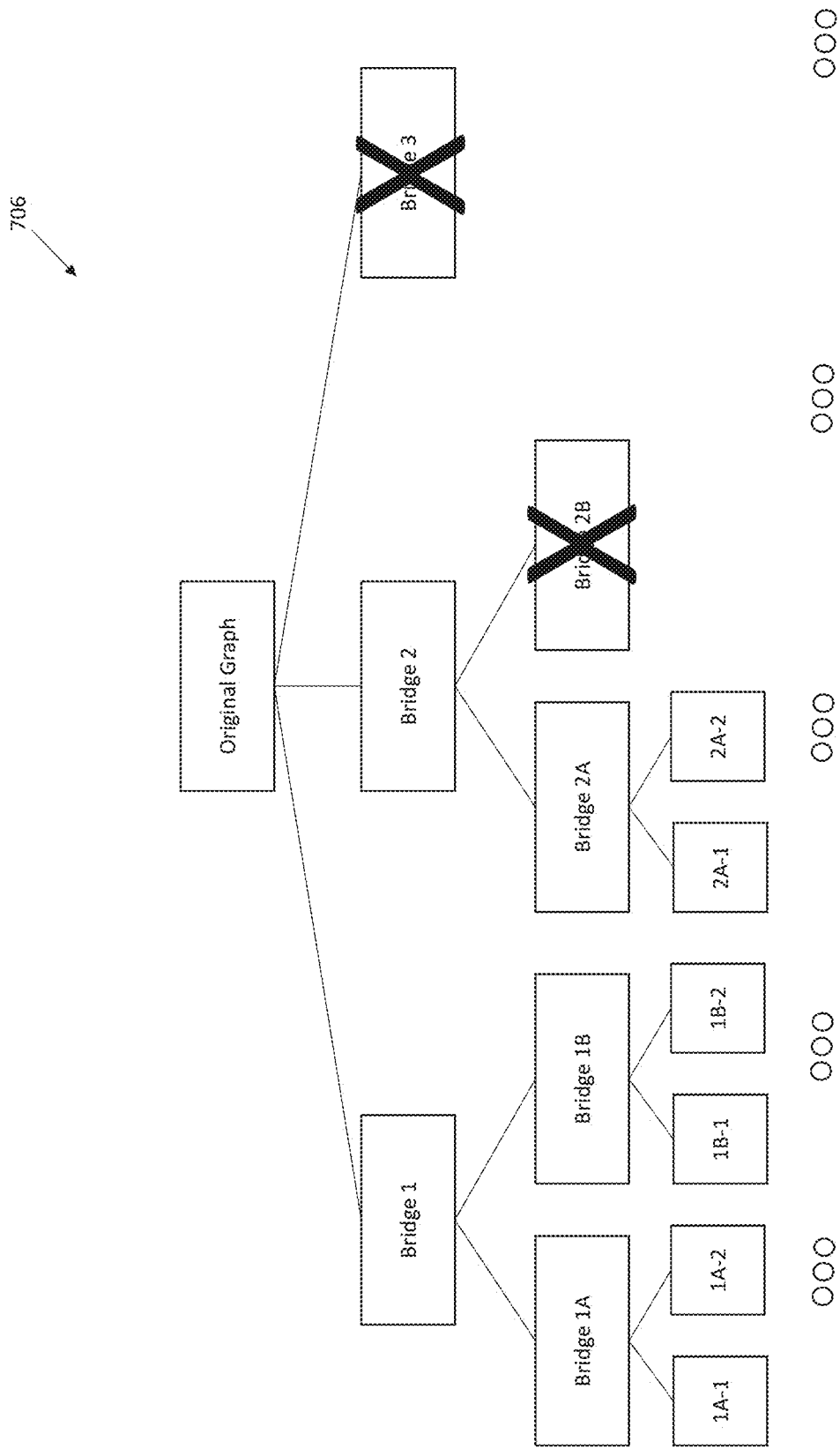

FIGS. 7A-7C illustrate an exemplary pruned search spaces according to examples of the disclosure. FIG. 7A illustrates a search space 700 which has not been pruned. In one or more examples, the bridges 1, 2, and 3 can represent the bridges identified at step 208 on the first iteration of the scoring and pruning process. Each bridge can be selected, the bridge removed from the original graph, and new graphs generated. For instance, bridge 1 can be selected for removal from the original graph, bridges 1A and 1B can represent bridges selected from the graphs created by removing bridge 1 from the original graph. In one or more examples, bridges 1A-1, and 1A-2 can represent the bridges selected from the graphs created by removing bridge 1A from the graphs created by removing bridge 1. The process can keep iterating for every bridge that has been identified but that has not been pruned.

In one or more examples, if a bridge is pruned, then that bridge is removed from consideration and no iterations of the process 200 are performed on the graph created by removing the pruned bridge. For instance, looking to the example of FIG. 7B, the search space 702 can be substantially similar to the search space 700 of FIG. 7 except that bridge 3 can be pruned using the process described above with respect to steps 210 and 212 of the process 200 of FIG. 2. Thus, once bridge 3 has been pruned, bridge 3 will not be selected at step 214, nor removed or used to generate new graphs that will be considered in further iterations as shown in FIG. 7B. In one or more examples, FIG. 7C illustrates a search space in which further iterations of the process when applied to graphs can also be pruned. For instance the search space 706 of FIG. 7C illustrates that bridge 2 can result in graphs that produce bridges 2A and 2B, however, while bridge 2A can be further used to generate graphs for assessment, bridge 2B can be pruned based on the scoring and pruning process described above. Thus, as collectively illustrated by FIGS. 7A-7C, the search space required to consider all bridges can be reduced using the scoring process so as to decrease the computing time necessary for the assignment, while at the same time assessing nodes in the graph that if removed will likely generate a worst-case scenario given a pre-determined number of nodes to remove in the assessment.

As shown in FIGS. 7A-7C, the process can keep iterating until either the number of nodes removed reaches the limit set by the user, or there are no longer any bridges available to cut from the graphs such that the limit is not reached. Thus, in one or more examples the search space tree of FIGS. 7A-7C can keep going deeper and increasing the number of levels until either the number of nodes removed is equal to the user defined number or the resultant graphs do not have bridges that can be cut. Returning to the example of FIG. 2, once there are not any more available bridges for a given path in the search space or the number of nodes to be removed has been met, then at step 206 a determination can be made that there are no further bridges, and the process can move to step 220 wherein the "network merit" of the node removals corresponding to the search space path being analyzed can be determined.

In one or more examples, computing merit at step 220 can include any metric that informs a user about the physical robustness of the network. Thus, in one or more examples, network merit can be a user supplied metric that can be used to determine the operational status of the network after the nodes have been removed through the process described above. Thus in one or more examples, examples of user programmable "network merit" includes: (1) the number of reachable nodes in the graph; (2) the number of disjoint network clusters; (3) the number of nodes within the clusters that have a specific attribute (e.g., end nodes and routers); (4) the number of isolated nodes (i.e., nodes that are not connected to any other nodes). In one or more examples, the network merit metric can be expressed positively (i.e., maximizing a specific outcome like reachable nodes) and/or negatively (i.e., maximizing the number of disjoint subnetworks or clusters). In one or more examples, step 220 can include generating a score based on the network merit definition provided by the user. As will be discussed in further detail below, the network merit score can be used to ultimately determine the worst-case scenario for a given number of node removals for a given computing network.

Figure 7D:
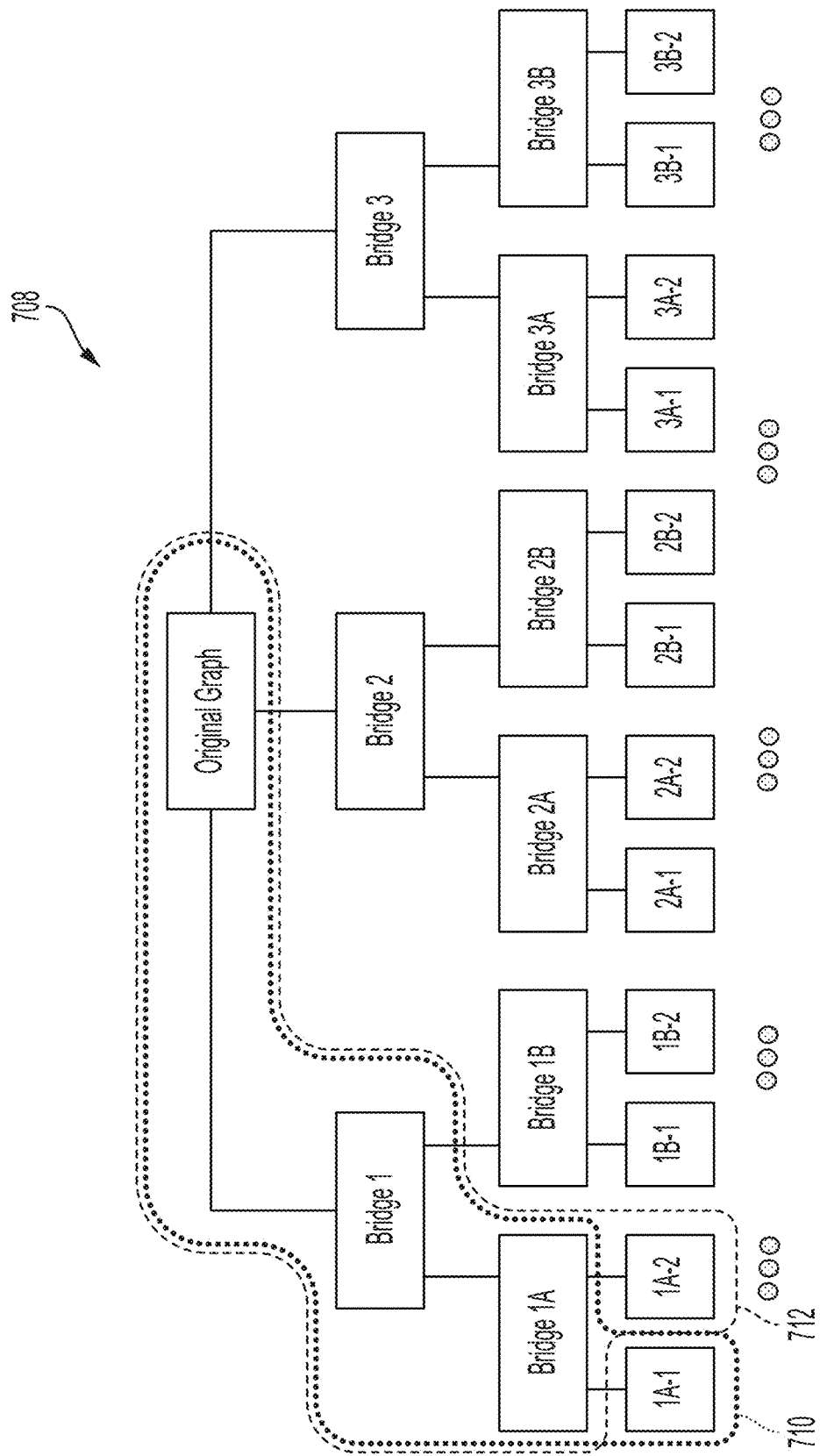

Once the network merit for a particular search path has been generated at step 220, the process 200 of FIG. 2 can move to step 220 wherein a determination can be made as to whether there are any more available bridges that have been previously scored, that still have not been analyzed to determine network merit. An example can help to illustrate the difference between step 222 and step 206. FIG. 7D illustrates an exemplary search space according to one or more examples of the disclosure. In one or more examples the search 708 can represent an unpruned search space for purposes of illustration. In one or more examples, two separate search paths 710 and 712 have been highlighted. In one or more examples, search path 710 starts with the original graph that had been provided, and ends with graphs created by bridge 1A-1. Step 206 of FIG. 2 represents looking at a single resulting graph caused by a node removal to continue along a given search path. In contrast, step 222 explores alternative search paths that have not been considered yet. Thus in one or more examples, starting at bridge 1A, at step 206 a determination can be made that there are more bridges that can be cut from the graph associated with 1A. At step 208, bridges 1A-1 and 1A-2 can be computed, scored at step 210, pruned at step 212, but at step 214 only bridge 1A-1 can be selected for further assessment. Once the process arrives back at step 206, an assessment can be made that there are no more bridges to be cut, and the process can move to step 220 wherein the network merit for search path 220 can be calculated. Once the network for search path 710 has been calculated, the process can move to step 222, wherein the bridge 1A-2 can be identified as having not been analyzed. Once bridge 1A-2 has been identified at step 222, the process can go to step 214 wherein search path 712 (which includes 1A-2) can be further processed until no other bridges are available and a network merit score for search path 712 can be generated. In this way the process 200 of FIG. 2 can iterate until all search paths (except for the ones that have pruned) have been explored. Returning to step 222, once every search path has been explored, there will be no more available bridges to consider and the process 200 can move to step 214. Prior to moving to step 214, each search path will have its own network merit score, and thus in one or more examples, at step 224, the search path with the lowest network merit (i.e., the search path that produces the worst-case outcome) can be selected and returned as the worst-case scenario for a given number of node removals.

Figure 8:
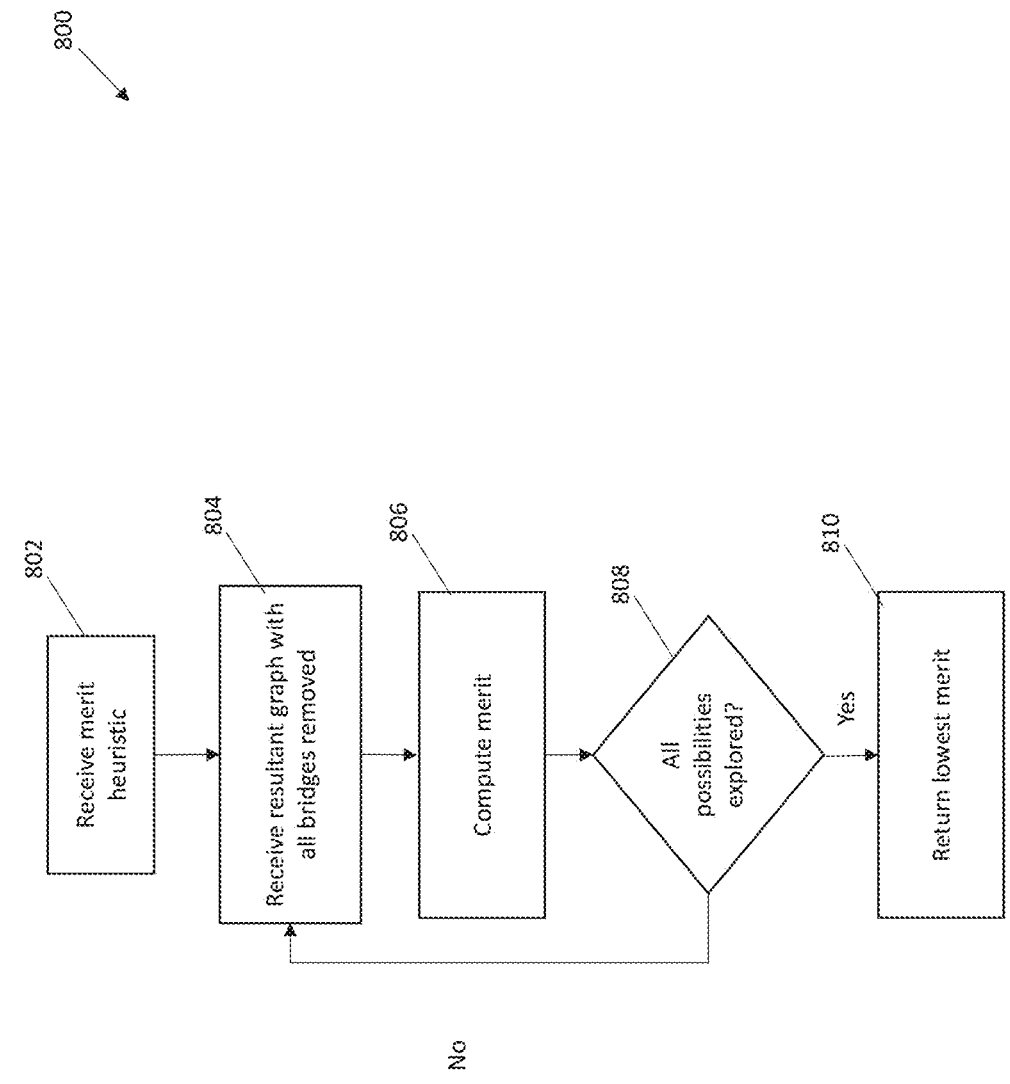
FIG. 8 illustrates an exemplary process for returning the lowest merit outcome graph according to examples of the disclosure.

FIG. 8 illustrates an exemplary process for returning the lowest merit outcome graph according to examples of the disclosure. In one or more examples, the process of 800 can represent a summary of the more detailed process illustrated with respect to FIG. 2. In one or more examples, the process 800 of FIG. 8 can begin at step 802 wherein a network merit heuristic can be received. In one or more examples, and as described above, a network merit heuristic can include a user provided scoring heuristic that assesses a network that results from removing a pre-determined number of nodes.

Once the heuristic is received at step 802, the process 800 can move to step 804 wherein the graph resulting from the node removals defined by a search path as described above is received. In one or more examples, the resultant graph can be created by removing the all of the bridges associated with a search path as described above. Once the graph is received at step 804, the process 800 can move to step 806 wherein the network merit of the graph is computed using the heuristic received at step 802. In one or more examples, once the network merit for the search path has been computed at step 806, the process 800 can move to step 808 wherein a determination is made as to whether all available search paths (i.e., node removal possibilities) have been explored. In one or more examples, if it is determined that there are other search paths to be explored then the process can revert to step 804 wherein a new resultant graph generated by removing the bridges associated with another search path is assessed using the network merit heuristic. In one or more examples, if at step 808 it is determined that all search paths have been assessed, then the process 800 can move to step 810 wherein the lowest network merit is returned as described above with respect to 224 of process 200 described above with respect to FIG. 2.

The above examples describe methods for determining worst case merit, however the disclosure should not be seen as limiting. For instance, in one or more examples, rather than describing determining the worst-case merit, the process can modified to instead return the average network merit which can be determined by taking the average of all computed network merits for each search path. The systems and methods described above can provide for a computationally efficient way of determining the robustness of a computing network to node removal. The systems and methods described above can be used to return accurate results even in the face of computational resource or time limitations. In one or more examples, the assessments or worst-case scenarios provided by the systems and methods described above can be used by a network designer or architect to modify a network design so as to increase the overall systems resiliency to having nodes removed from a network during operation of the network.

Figure 9:
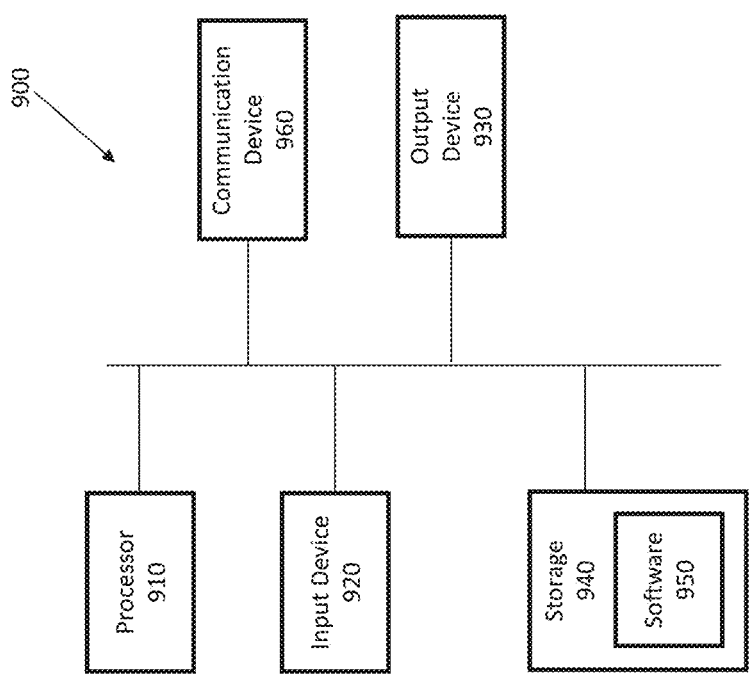
FIG. 9 illustrates an exemplary computing system, according to examples of the disclosure.

FIG. 9 illustrates an example of a computing system 900, in accordance with some examples of the disclosure. System 900 can be a client or a server. As shown in FIG. 9, system 900 can be any suitable type of processor-based system, such as a personal computer, workstation, server, handheld computing device (portable electronic device) such as a phone or tablet, or dedicated device. The system 900 can include, for example, one or more of input device 920, output device 930, one or more processors 910, storage 940, and communication device 960. Input device 920 and output device 930 can generally correspond to those described above and can either be connectable or integrated with the computer.

Input device 920 can be any suitable device that provides input, such as a touch screen, keyboard or keypad, mouse, gesture recognition component of a virtual/augmented reality system, or voice-recognition device. Output device 930 can be or include any suitable device that provides output, such as a display, touch screen, haptics device, virtual/augmented reality display, or speaker.

Storage 940 can be any suitable device that provides storage, such as an electrical, magnetic, or optical memory including a RAM, cache, hard drive, removable storage disk, or other non-transitory computer readable medium. Communication device 960 can include any suitable device capable of transmitting and receiving signals over a network, such as a network interface chip or device. The components of the computing system 900 can be connected in any suitable manner, such as via a physical bus or wirelessly.

Processor(s) 910 can be any suitable processor or combination of processors, including any of, or any combination of, a central processing unit (CPU), field programmable gate array (FPGA), and application-specific integrated circuit (ASIC). Software 950, which can be stored in storage 940 and executed by one or more processors 910, can include, for example, the programming that embodies the functionality or portions of the functionality of the present disclosure (e.g., as embodied in the devices as described above)

Software 950 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 940, that can contain or store programming for use by or in connection with an instruction execution system, apparatus, or device.

Software 950 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 900 can implement any operating system suitable for operating on the network. Software 950 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for assessing the physical robustness of a computing network, the method comprising:
   receiving one or more scores associated with one or more bridges of a graph representation of a computing network, wherein a bridge of the one or more bridges comprises one or more nodes of the graph that when removed from the graph result in two or more disjoint networks;
   determining a processing load of one or more processors performing the method;
   determining a pruning factor based on the processing load of the one or more processors;
   comparing the received scores associated with the one or more bridges to the determined pruning factor;
   selecting at least one of the one or more bridges based on the comparison of the scores associated with the one or more bridges to the determined pruning factor;
   removing the one or more nodes of the generated graph associated with the selected bridge to generate one or more resultant graphs; and
   determining a network merit score for the one or more resultant graphs.

2. The method of claim 1, the method comprising:
   determining a network merit score based on the selected one or more identified bridges; and
   determining a lowest scored network merit of the one or more network merit scores associated with the one or more selected one or more bridges.

3. The method of claim 2, wherein determining a network merit score comprises;
   receiving a network merit heuristic; and
   applying the received network merit heuristic to the generated one or more resultant graphs.

4. The method of claim 3, wherein the network merit heuristic comprises determining the number of reachable nodes for each node in the network.

5. The method of claim 3, wherein the network merit heuristic comprises determining the number of disjoint network clusters.

6. The method of claim 1, comprising identifying the one or more bridges of the graph representation of the computing network, wherein identifying the one or more bridges comprises:
   selecting a subset of nodes and edges from the graph representation of the computing network, wherein the subset of nodes and edges form a connected graph;
   selecting a source node from the subset of nodes;
   selecting a sink node from the subset of nodes; and
   applying a maximum flow minimum cut process using selected subset of nodes and edges, the selected source node, and the selected sink node.

7. The method of claim 6, wherein the number of nodes and edges selected for the subset is based on the size of the graph representation of the computing network.

8. The method of claim 1, wherein the one or more scores associated with the one or more bridges were determined by:
   receiving a scoring heuristic;
   removing one or more nodes associated with one or more bridges from the graph representation of the computing network to generate a resultant graph; and
   applying the scoring heuristic to the resultant graph; and
   generating a score for the one or more bridges based on the applied scoring heuristic.

9. The method of claim 1, wherein selecting at least one of the one or more bridges based on the comparison of the scores associated with the one or more bridges to the determined pruning factor comprises selecting one or more of the bridges if the score associated with the bridge is greater than the pruning factor.

10. The method of claim 9, wherein selecting at least one of the one or more bridges based on the comparison of the scores associated with the one or more bridges to the determined pruning factor comprises removing the bridge from further consideration in the assessment if the score associated with the bridge is not greater than the pruning factor.

11. A system for assessing the physical robustness of a computing network, the system comprising:
   a memory;
   one or more processors;
   wherein the memory stores one or more programs that when executed by the one or more processors, cause the one or more processors to:
      receive one or more scores associated with one or more bridges of a graph representation of a computing network, wherein a bridge of the one or more bridges comprises one or more nodes of the graph that when removed from the graph result in two or more disjoint networks;
      determine a processing load of one or more processors performing the method;
      determine a pruning factor based on the processing load of the one or more processors;
      compare the received scores associated with the one or more bridges to the determined pruning factor;
      select at least one of the one or more bridges based on the comparison of the scores associated with the one or more bridges to the determined pruning factor;
      remove the one or more nodes of the generated graph associated with the selected bridge to generate one or more resultant graphs; and
      determine a network merit score for the one or more resultant graphs.

12. The system of claim 11, wherein the one or more programs that when executed by the one or more processors, cause the one or more processors to:
   determine a network merit score based on the selected one or more identified bridges; and
   determine a lowest scored network merit of the one or more network merit scores associated with the one or more selected one or more bridges.

13. The system of claim 12, wherein determining a network merit score comprises;
   receiving a network merit heuristic; and
   applying the received network merit heuristic to the generated one or more resultant graphs.

14. The system of claim 13, wherein the network merit heuristic comprises determining the number of reachable nodes for each node in the network.

15. The system of claim 13, wherein the network merit heuristic comprises determining the number of disjoint network clusters.

16. The system of claim 11, wherein the one or more programs that when executed by the one or more processors, cause the one or more processors to: identify the one or more bridges of the graph representation of the computing network, wherein identifying the one or more bridges comprises:

selecting a subset of nodes and edges from the graph representation of the computing network, wherein the subset of nodes and edges form a connected graph;

selecting a source node from the subset of nodes;

selecting a sink node from the subset of nodes; and applying a maximum flow minimum cut process using selected subset of nodes and edges, the selected source node, and the selected sink node.

17. The system of claim 16, wherein the number of nodes and edges selected for the subset is based on the size of the graph representation of the computing network.

18. The system of claim 11, wherein the one or more scores associated with the one or more bridges were determined by:

receiving a scoring heuristic;

removing one or more nodes associated with one or more bridges from the graph representation of the computing network to generate a resultant graph; and applying the scoring heuristic to the resultant graph; and generating a score for the one or more bridges based on the applied scoring heuristic.

19. The system of claim 11, wherein selecting at least one of the one or more bridges based on the comparison of the scores associated with the one or more bridges to the determined pruning factor comprises selecting one or more of the bridges if the score associated with the bridge is greater than the pruning factor.

20. The system of claim 19, wherein selecting at least one of the one or more bridges based on the comparison of the scores associated with the one or more bridges to the determined pruning factor comprises removing the bridge from further consideration in the assessment if the score associated with the bridge is not greater than the pruning factor.

21. A non-transitory computer readable storage medium storing one or more programs for assessing the physical robustness of a computing network, the programs for execution by one or more processors of an electronic device that when executed by the device, cause the device to:

receive one or more scores associated with one or more bridges of a graph representation of a computing network, wherein a bridge of the one or more bridges comprises one or more nodes of the graph that when removed from the graph result in two or more disjoint networks;

determine a processing load of one or more processors performing the method;

determine a pruning factor based on the processing load of the one or more processors;

compare the received scores associated with the one or more bridges to the determined pruning factor;

select at least one of the one or more bridges based on the comparison of the scores associated with the one or more bridges to the determined pruning factor;

remove the one or more nodes of the generated graph associated with the selected bridge to generate one or more resultant graphs; and determine a network merit score for the one or more resultant graphs.

22. The non-transitory computer readable storage medium of claim 21, wherein the one or more programs that when executed by the one or more processors, cause the device to:

determine a network merit score based on the selected one or more identified bridges; and determine a lowest scored network merit of the one or more network merit scores associated with the one or more selected one or more bridges.

23. The non-transitory computer readable storage medium of claim 22, wherein computing a network merit score comprises:

receiving a network merit heuristic; and applying the received network merit heuristic to the generated one or more resultant graphs.

24. The non-transitory computer readable storage medium of claim 23, wherein the network merit heuristic comprises determining the number of reachable nodes for each node in the network.

25. The non-transitory computer readable storage medium of claim 23, wherein the network merit heuristic comprises determining the number of disjoint network clusters.

26. The non-transitory computer readable storage medium of claim 21, wherein the one or more programs that when executed by the one or more processors, cause the device to identify the one or more bridges of the graph representation of the computing network, wherein identifying the one or more bridges comprises:

selecting a subset of nodes and edges from the graph representation of the computing network, wherein the subset of nodes and edges form a connected graph;

selecting a source node from the subset of nodes;

selecting a sink node from the subset of nodes; and applying a maximum flow minimum cut process using selected subset of nodes and edges, the selected source node, and the selected sink node.

27. The non-transitory computer readable storage medium of claim 26, wherein the number of nodes and edges selected for the subset is based on the size of the graph representation of the computing network.

28. The non-transitory computer readable storage medium of claim 21, wherein the one or more scores associated with the one or more bridges were determined by:

receiving a scoring heuristic;

removing one or more nodes associated with one or more bridges from the graph representation of the computing network to generate a resultant graph; and applying the scoring heuristic to the resultant graph; and generating a score for the one or more bridges based on the applied scoring heuristic.

29. The non-transitory computer readable storage medium of claim 21, wherein selecting at least one of the one or more bridges based on the comparison of the scores associated with the one or more bridges to the determined pruning factor comprises selecting one or more of the bridges if the score associated with the bridge is greater than the pruning factor.

30. The non-transitory computer readable storage medium of claim 29, wherein selecting at least one of the one or more bridges based on the comparison of the scores associated with the one or more bridges to the determined pruning factor comprises removing the bridge from further consideration in the assessment if the score associated with the bridge is not greater than the pruning factor.

* * * * *